(12) United States Patent
Liddell et al.

(10) Patent No.: US 10,988,826 B2
(45) Date of Patent: Apr. 27, 2021

(54) HYDROMETALLURGICAL TREATMENT PROCESS FOR EXTRACTION OF PRECIOUS, BASE AND RARE ELEMENTS

(71) Applicant: LIFEZONE LIMITED, Ebene (MU)

(72) Inventors: Keith Stuart Liddell, Surrey (GB); Michael David Adams, Phuket (TH)

(73) Assignee: LIFEZONE LIMITED, Ebene (MU)

( * ) Notice: Subject to any disclaimer, the term of this patent is extended or adjusted under 35 U.S.C. 154(b) by 365 days.

(21) Appl. No.: 16/014,340

(22) Filed: Jun. 21, 2018

(65) Prior Publication Data

US 2018/0371578 A1   Dec. 27, 2018

(30) Foreign Application Priority Data

Jun. 22, 2017  (ZA) .................................. 2017/04241

(51) Int. Cl.
| | |
|---|---|
| *C22B 3/00* | (2006.01) |
| *C22B 3/20* | (2006.01) |
| *C22B 3/10* | (2006.01) |
| *C22B 3/44* | (2006.01) |
| *C22B 3/08* | (2006.01) |
| *C22B 3/12* | (2006.01) |

(52) U.S. Cl.
CPC ................. *C22B 3/20* (2013.01); *C22B 3/08* (2013.01); *C22B 3/10* (2013.01); *C22B 3/12* (2013.01); *C22B 3/44* (2013.01); *C22B 11/04* (2013.01)

(58) Field of Classification Search
CPC ..... C22B 3/20; C22B 3/12; C22B 3/10; C22B 3/08; C22B 3/44; C22B 11/04
See application file for complete search history.

(56) References Cited

U.S. PATENT DOCUMENTS

| | | | | |
|---|---|---|---|---|
| 5,232,490 | A * | 8/1993 | Bender | ..................... C22B 3/08 423/27 |
| 6,579,504 | B1 * | 6/2003 | Liddell | ................... C22B 11/06 423/22 |
| 9,540,706 | B2 * | 1/2017 | Liddell | ..................... C22B 3/10 |
| 9,982,320 | B2 * | 5/2018 | Liddell | ..................... C22B 3/08 |
| 10,011,889 | B2 * | 7/2018 | Liddell | ..................... C22B 3/08 |

\* cited by examiner

*Primary Examiner* — Steven J Bos
(74) *Attorney, Agent, or Firm* — Browdy and Neimark, PLLC

(57) ABSTRACT

This invention relates to a hydrometallurgical process for the recovery and separation of valuable precious, base or rare elements such as platinum group metals (PGMs), gold or silver, and other valuable base and rare metals such as nickel, cobalt, copper, rare earth elements (REE), yttrium and scandium, as well as uranium, thorium, manganese, zinc, cadmium, molybdenum, titanium, tin, and other minor elements such as vanadium, germanium and gallium from a feed material comprising ores, concentrates and other materials. In particular, the process comprises quantitative removal of additional base, rare and gangue elements for increased efficiency of further treatment of the solids for valuable metals recovery and/or recycling and/or separation of valuable metals from pressure leach residue and may be integrated into one or more existing valuable element extraction processes.

31 Claims, 4 Drawing Sheets

HYDROMETALLURGICAL TREATMENT PROCESS FOR EXTRACTION OF PRECIOUS, BASE AND RARE ELEMENTS

BACKGROUND OF THE INVENTION

This invention relates to a hydrometallurgical process for the recovery and separation of valuable precious, base or rare elements from a feed material comprising ores, concentrates and other materials. In particular, the process is a process integrated into one or more existing valuable element extraction processes.

Polymetallic orebodies or other feedstocks containing multiple valuable metals at lower grades are becoming increasingly attractive for resource companies to assess their potential for exploitation. However, to date there are far greater metallurgical challenges in the recovery and separation of such elements into commercially feasible concentrates or products. This is generally the case for ores containing valuable metals such as platinum group metals (PGMs), gold or silver, and other valuable base and rare metals such as nickel, cobalt, copper, rare earth elements (REE), yttrium and scandium, as well as uranium, thorium, manganese, zinc, cadmium, molybdenum, titanium, tin, and other minor elements such as vanadium, germanium and gallium.

Selection of the process route for recovery and separation of valuable elements from both sulphate and chloride pregnant leach solution (PLS) for any specific application is driven largely by project-specific criteria such as end-product requirements, as well as ore and concentrate assay suite and mineralogy. Production of market-driven end-products, such as separate PMs, oxides, salts or other products, as well as mixed high-grade concentrates with particular impurity profiles may be required, for example.

The PGMs, gold, silver and other value elements are in some cases recovered from the chloride PLS by adsorbing these elements onto ion-exchange (IX) resins or other sorbent media and subsequently recovering the elements by elution, for example using a thiourea solution. PMs can be precipitated from the eluate using a caustic or ammoniacal solution to form one or more high-grade PM concentrate products for direct sale or refining, as described in International Patent Publication No. WO 99/60178. Alternatively, the loaded resin or sorbent can be incinerated directly to produce a high-grade PM concentrate product for refining, or may be shipped directly to the refinery.

However, in other cases, production of end products with certain targeted specifications may be required, whereby such specifications are best achieved via alternative methods.

Thus, the direct IX route described above is not always optimal for all feed and product types, such as for cases where the PLS contains elements or species at levels that may interfere with the IX adsorption process. An alternative process for the recovery and separation of precious metals and other valuable elements from PLS that meets the criteria for other feed and product types is therefore needed.

Moreover, additional valuable elements are contained in the leach process streams described in steps (i) and (iv) above, and these valuable elements may equally warrant recovery and/or recycling and/or separation into added-value products.

Alternative processes for the quantitative removal of additional base, rare and gangue elements from pressure leach residue, allowing for increased efficiency of further treatment of the solids for valuable metals recovery and/or recycling and/or separation of valuable metals such as platinum group metals (PGMs), gold or silver, and other valuable base and rare metals such as nickel, cobalt, copper, rare earth elements (REE), yttrium and scandium, as well as uranium, thorium, manganese, zinc, cadmium, molybdenum, titanium, tin, and other minor elements to produce saleable high-grade value metals and/or metal cathodes, powders, salts or precipitate products thereof would therefore be very useful. In particular, a process for the efficient removal of iron and other gangue elements from the process that are responsible for high consumption of costly reagents would be highly beneficial. Furthermore, removal of these gangue elements should decrease the mass flow for downstream treatment, and effectively remove potential reagent consumers in the optional heat treatment step and non-optional chlorination leach step.

Furthermore, there is a considerable range of feedstock materials for potential extraction of precious, base or rare elements that are either untreatable using current conventional technologies, or that respond poorly, or may require the specific flowsheet development, design and construction of a custom-built plant that may be too costly to justify the capital spend given the size and other characteristics of the particular resource. In all cases, the ultimate precious, base or rare metals recovery may be less than desirable. It would be highly commercially beneficial to have a process that accepts a wide variety of refractory or non-refractory material types as feed, with no or minimal modifications to the circuit from one feed type to the next.

SUMMARY OF THE INVENTION

According to a first embodiment of the invention, there is provided a hydrometallurgical process for extracting one or more saleable metals selected from the group consisting of platinum group metals (PGMs) i.e. platinum, palladium, rhodium, iridium, ruthenium and osmium; gold and silver; base metals comprising nickel, cobalt, copper, zinc, yttrium, scandium, uranium, thorium, manganese, zinc, cadmium, molybdenum, titanium, and tin; rare earth elements (REE); and rare elements comprising vanadium, germanium and gallium from a feed material containing saleable metals comprising or consisting of any one or more of a metalliferous ore; a concentrate; a solid residue from a hydrometallurgical process on a metalliferous feedstock; and a solid residue after solid-liquid separation of a product slurry from hot sulphuric acid leaching under pressure and/or atmospheric conditions from the metalliferous ore, concentrate or solid residue, the process comprising or consisting of subjecting the feed material to the following steps:

a) leaching with hot hydrochloric acid or brine under pressure and/or atmospheric conditions either with no added oxidant or reductant or with an added reductant, to produce a product slurry comprising saleable and gangue metal chlorides in a hydrochloric acid solution and a solid residue containing saleable metals consisting of any one or more of PGMs, gold, silver, and any minor associated base, REEs or rare metals for recovery;

b) subjecting the hydrochloric acid or brine solution comprising metal chlorides from step a) to a purification and/or upgrade step comprising any one or more of solvent extraction, ion exchange (IX), chelating, molecular recognition technology (MRT), polymeric or other sorbents; precipitation using hydroxides, ammonia, carbonates or sulphides, electrowinning, reduction or other techniques known to those skilled in the art based on techno-economic considerations to produce an intermediate solution product and one or more intermediate solid residues comprising secondary scavenged value metals and gangue elements;

c) subjecting the intermediate solution products from step b) to one or more steps including preboil, rectification, distillation, adsorption, reboil, pyrohydrolysis, spray roasting, hydrothermal or other technique combinations known to those skilled in the art thereby to yield hydrochloric acid, calcium, iron and saleable metals for recovery or residual gangue material for disposal and a barren solution;

d) subjecting the intermediate solid residue, after solid-liquid separation, from step a) to oxidising chlorination leaching to produce soluble saleable metal chlorides in a chlorination pregnant leach solution (PLS) and a solid waste product;

e) subjecting the chlorination PLS comprising metal chlorides from step d) to any one or more of ion exchange (IX), chelation, molecular recognition technology (MRT), polymeric or other sorbents, solvent extraction, precipitation using hydroxides, ammonia, carbonates or sulphides, electrowinning, reduction, or other techniques known to those skilled in the art based on techno-economic considerations to produce a secondary intermediate solution product and a solid residue containing saleable metals consisting of any one or more of PGMs, gold and silver, and optionally any one or more of minor associated base, REE and rare metals for recovery;

f) subjecting the secondary intermediate solution product or solid residue from step e) to one or more techniques including preboil, rectification, distillation, adsorption, reboil, pyrohydrolysis, spray roasting, hydrothermal or other techniques known to those skilled in the art to yield one or more of hydrochloric acid, calcium, iron and saleable metals for recovery or residual gangue material for disposal and a barren solution; and g) recovery of saleable metals consisting of any one or more of PGMs, gold and silver, and optionally any one or more of minor associated base, REE and rare metals from the solid residue.

If required for specific ore types, depending on techno-economic considerations, the process may further comprise a step of subjecting the solid residue from step a) to heat treatment under oxidising, neutral or reducing conditions prior to inputting the heat-treated solid residue into step d) above, or into a duplicate hot hydrochloric acid leaching step a).

The chlorination PLS from step d), and/or the intermediate solution product from either step b) or e) may additionally be subjected to one or more further purification and/or upgrading techniques including IX, chelating, MRT, polymeric or other sorbents, solvent extraction, precipitation using hydroxides, ammonia, carbonates or sulphides, electrowinning, reduction, or other techniques known to those skilled in the art based on techno-economic considerations to produce further intermediate solid residues for the recovery of PGMs, gold and silver, as well as any minor associated and other valuable base, REE or rare metals and further intermediate solution products for inputting into step f).

In the case where there is an initial step of hot sulphuric acid leaching yielding a product slurry, the solid residue containing saleable metals may be separated from the saleable metal sulphates in solution by filtration or by any other solid/liquid separation means known to those skilled in the art.

The process may further comprise a step of separating solid residue from the saleable metal chlorides in solution from step a), b), c), d), e) and/or, where relevant from the further intermediate solution products and then providing the resultant separated solution to the relevant next step in the process. The step of separating may be performed by filtration, or by any other solid/liquid separation means known to those skilled in the art.

The feed material ore, concentrate, or residue may be initially processed by crushing, milling or may be as-mined. Alternatively, or in addition, the feed material may be subjected to a benefication step to produce an intermediate ore product for providing to the reaction vessel. The benefication step may be performed by a combination of crushing, grinding, screening, sizing, classification, magnetic separation, electrostatic separation, flotation or gravity separation thereby to concentrate the valuable metals or reject a gangue component, or by other means of beneficiation known to those skilled in the art.

The thermal treatment may be performed at from or about 80-750° C. for up to 120 minutes, typically at from or about 300-700° C. for 10 to 30 minutes, under oxidizing, neutral or reducing conditions, to remove volatile components from the solid residue and reduce or negate any preg-robbing attributes of the material, whilst rendering refractory mineral phases such as PGM-bearing minerals or silver jarosites suitable for recovery by subsequent leaching.

An additional second thermal treatment may be performed at from or about 500-1000° C. for up to 120 minutes, typically at from or about 700-1000° C. for 30 to 120 minutes, under oxidizing, neutral or reducing conditions, to condition saleable metals to be soluble in chloride leaching medium.

A third additional thermal treatment may be performed at from or about 100-600° C. for up to 240 minutes, typically at from or about 100-400° C. for 60-180 minutes, under oxidizing, neutral or reducing conditions, to further condition saleable metals to be soluble in chloride leaching medium.

The thermal processes may be performed as individual steps of a sequential thermal treatment process, or as one combined step.

The off-gases discharging from one or more of the thermal treatment steps, or any reducing gas such as syngas, carbon monoxide or hydrogen, may be further utilised by sparging into the slurry in step a) or the hydrochloric acid solution in step b) or the chlorination PLS in step e). For example, a reducing off-gas may reduce precious metals such as PGMs or gold in solution, converting them to metals that report to the solid phase for recovery in the subsequent chlorination step d). As another example, the gold or PGMs in solution in steps b) or e) may be recovered by reductive precipitation using a reducing off-gas.

In a further embodiment of the invention, the chlorination PLS of step d) and/or the intermediate solution product of step b), step e) and/or where relevant the further intermediate solution product in the first embodiment above may be subjected to a sorption step whereby saleable metals are adsorbed on to a resin or sorbent and base metals are discharged in a solution.

In a further embodiment of the invention the chlorination PLS of step d) and/or the solution product of step b), step e) and/or where relevant the further intermediate solution product in the first embodiment above may be subjected to precipitation and purification comprising or consisting of any one or more of the following steps:

A. subjecting the any one or more of the chlorination PLS of step d) or the intermediate solution product of step b), step e) and/or where relevant the further intermediate solution product above, to sulphide precipitation, thereby to produce a product slurry comprising a solid residue containing elemental sulphur, metal sulphides and/or alloys and a discharge solution;

B. performing solid-liquid separation on the product slurry of A. to separate the solid residue from step A. above from the discharge solution, for example by filtration or by means of another suitable solid-liquid separation device, at temperatures of between about or from 10-130° C.;

C. subjecting the solid residue from step B. to a series of purification and recovery steps comprising or consisting of:

C.i. sublimation of the solid residue at temperatures of between about or from 200-500° C. (typically in a kiln or other suitable heat treatment device), thereby to remove sulphur and produce a solid residue and a sulphur distillate product;

C.ii. optionally dissolving the solid residue of step C.i. (for example, in a stirred vessel or other suitable contactor) in a suitable solvent for sulphur, including but not limited to: aromatic hydrocarbons (e.g. xylene and/or its isomers or mixtures (such as xylol), toluene, ethylbenzene, etc.); chlorinated or sulphidised hydrocarbons (e.g. carbon tetrachloride, chloroform, carbon disulphide, etc.); or sulphur-containing ligands (e.g. sulphite, sulphide, etc.), at temperatures of between about 10-130° C., thereby to remove sulphur and produce a solid residue and a sulphur distillate product;

C.iii. pressure oxidation leaching the solid residue from step C.i. and/or where relevant step C.ii., at temperatures of between about or from 110-230° C.;

C.iv. atmospheric sulphuric acid leaching the solid residue from step C.iii. at temperatures of between about or from 10-110° C. to yield a slurry comprising a solid residue including saleable metals and a sulphate leachate solution;

C.v. separating the solid residue comprising saleable metals from the sulphate leachate solution in the slurry of step C.iv. by solid-liquid separation, for example by filtration or by means of another suitable solid-liquid separation device, at temperatures of between about or from 10-130° C.;

C.vi. optionally subjecting the sulphate leachate solution from step C.vi. to a sorption step whereby saleable metals are adsorbed to a resin or sorbent and base metals are discharged in a solution; and C.vii. subjecting the sulphate leachate solution from step C.v. and, where relevant, the discharge solution from step C.vii. to one or more techniques including ageing, evaporation, precipitation and/or recycling into a Kell Process primary base metals recovery circuit as described in WO99/60178; and D. optionally subjecting the discharge solution from step B. to a sorption step whereby saleable metals are adsorbed to a resin or sorbent and base metals are discharged in a solution.

In a further embodiment of the invention, the discharge solution from step B. and/or the intermediate solution product from step b), e) and/or where relevant the further intermediate solution product of the first embodiment of the invention may be subjected to a hydrochloric acid, calcium and residual base metal recovery and separation step comprising or consisting of:

I. feeding the discharge solution and/or the intermediate solution product into a preboil evaporator together with seed gypsum thereby to generate a hydrochloric acid gas and gypsum precipitate, followed by solid-liquid separation to yield precipitated gypsum for recovery and a treated discharge solution;

II. feeding the treated discharge solution from step I. to a sulphuric acid rectification column or reboiler together with sulphuric acid, thereby to generate a hydrochloric acid gas and a sulphuric acid solution comprising saleable and/or recoverable base and/or rare metals;

III. alternatively, feeding the discharge solution from step I. to a hydrothermal, spray roaster or pyrohydrolysis reactor to yield a slurry comprising a solid iron oxide residue for recovery and a base and/or rare metals solution, followed by solid-liquid separation;

IV. subjecting the sulphuric acid solution generated in step II. and/or the base and/or rare metals metal solution from step III. to a cooling and aging step, whereby the metal sulphate salts crystallise or are subjected to a sorption step and are recovered, for example by evaporation or precipitation and/or are recycled back into into a Kell Process primary base metals recovery circuit as described in WO99/60178 or may be discarded in cases where valuable metals have already been sufficiently removed in the sulphuric and/or hydrochloric acid leaching steps; and V. subjecting the hydrochloric acid gas of step I. or step II. to distillation and absorption, thereby to recover a hydrochloric acid solution.

The recovered hydrochloric acid may be recycled back into the hydrochloric acid leach step a) and/or the chlorination leach step d).

The barren solution from step c) and/or step f) may be recycled to step b) as makeup water, also allowing for reuse of hydrochloric acid.

Typically, the saleable metal sulphates in solution of the feed material of the first embodiment of the invention may comprise metal sulphate salts, such as copper, nickel, cobalt, rhodium, ruthenium, iridium, vanadium, germanium, gallium or scandium.

The feed material of the first embodiment of the invention may comprise either an individual material or a blend of refractory and non-refractory materials differing in nature.

The process of the invention may optionally further comprise or consist of an initial step of subjecting the hydrochloric acid solution of step a) and/or the chlorination PLS of step d) (i.e. the chloride PLS) to an ageing step for crystallisation of silica, comprising or consisting of:

I. feeding the hydrochloric acid solution or chloride PLS into a holding vessel;

II. adding seed silica solids to the chloride solution of I.;

III. allowing the chloride solution to stand at ambient temperature until a solid residue comprising silica is precipitated out of solution;

IV. separating the precipitated solid residue comprising silica from the solution of step III. to produce a silica-depleted solution; and V. feeding the silica-depleted solution of step IV. into step a) or d).

The process of the invention may optionally comprise an initial step of subjecting any one or more of the hydrochloric acid solution of step a), the chlorination PLS of step d), the intermediate solution products from step b), c) or e), and the further intermediate solution product to a concentration step to produce a concentrated solution by any one or more of:

I. evaporation and condensation recovery of HCl from the solution(s); and

II. filtration or membrane-based separation, comprising reverse osmosis (RO) or nanofiltration (NF) of the solution(s).

The sorption steps of the process may comprise or consist of any one or more of the following steps:

I. contacting the solution of the process with one or more ion exchange (IX) resins or suitable sorbents whereby saleable metals, including gold, silver and PGMs if present, are adsorbed to the resin or sorbent and base metals are discharged in a solution;

II. eluting the adsorbed saleable metals, including gold, silver and PGMs if present, from the IX resin or sorbent and precipitating the gold, silver and PGMs if present, from the eluate using a reductant or, if PGMs are present, using a caustic, ammoniacal or other eluant solution to form a high-grade value metal concentrate or individual value metal products;

III. directly incinerating the loaded resin or sorbent to produce a high-grade value metal concentrate or individual value metal products; and IV. optionally, further processing of the saleable metals produced by any of steps I. to III.

The elution step II. may be performed using a solution comprising acidic thiourea, salts of sulphite or hydrosulphite or chloride, or other eluants known to those skilled in the art.

Furthermore, technologies such as precipitation or crystallization may be employed in the process to produce a potentially saleable or storable ferric or ferrous hydroxide or sulphate or chloride product while recovering sulphuric or hydrochloric acid into a stream suitable for recycling.

Furthermore, technologies such as solvent extraction may be employed in the process, for example on the hot sulphuric acid pressure leach PLS, to produce a potentially useable, saleable or storable sulphuric acid product and/or recovering sulphuric acid into a stream suitable for recycling; or on the hot hydrochloric acid PLS, to produce a potentially useable, saleable or storable hydrochloric acid and/or iron chloride product, and/or recovering hydrochloric acid into a stream suitable for recycling.

The hydrochloric acid leach solution of step a) or c) and/or the chlorination leach solution of step d) of the first embodiment of the invention may contain iron chloride and may be treated by pressure, precipitation or crystallization, concentrated by evaporation, reverse osmosis, nanofiltration or other membrane technology, solvent extraction or ion exchange or treated by sparging/rectification, pyrohydrolysis, hydrothermal or other technology known to those skilled in the art to produce an iron-bearing product.

In certain embodiments of the invention, the hydrochloric acid leach or brine leach solution of step a), b) or c) may be neutralised with limestone to precipitate ferric hydroxide and other gangue elements and produce a calcium chloride filtrate, which may be evaporated and the calcium removed by sulphuric acid addition. The hydrochloric acid, brine or calcium chloride filtrate may then be recycled to step a) or d) above.

The chlorination leaching medium of step d) may comprise hydrochloric acid or saline brine in conjunction with an oxidising agent such as chlorine, hypochlorite, hydrogen peroxide or other oxidising agents known to those skilled in the art and the leaching step may be performed under oxidising conditions, thereby to generate a chlorination PLS containing one or more saleable elements comprising or consisting of PGMs, Au, Ag, Ni, Co, Cu, REE, Y, Sc, U, Th, Zn, Mn, Cd, Mo, V, Sn and Ti.

The chlorination PLS generated in step d) may contain one or more saleable elements comprising or consisting of PGMs, Au, Ag, as well as Ni, Co, Cu, REE, Y, Sc, U, Th, Zn, Mn, Cd, Mo, V, Sn and Ti and may be subjected to separation and/or recovery of the one or more saleable elements by means of techniques such as solvent extraction, IX, precipitation using hydroxides, carbonates or sulphides, electrowinning, reduction and other techniques known to those skilled in the art based on techno-economic considerations.

In a further particular embodiment, the chlorination leaching step d) may comprise a less acidic chloride leaching medium having a pH of between about 2.5 and 7.5 held at a temperature in the range of between about or from 50-150° C.

In a further particular embodiment, the chlorination leaching step d) may comprise a chloride leaching medium with a free acidity of between about or from 50 to 300 g/L HCl held at a temperature in the range of between about or from 50-150° C.

According to a further particular embodiment, the chlorination leaching step d) may be performed by atmospheric or pressure autoclave leaching with saline brine under oxidising conditions.

According to an alternative embodiment of the invention, there is provided a hydrometallurgical process for extracting one or more saleable metals selected from the group consisting of precious elements comprising platinum group metals (PGMs) i.e. platinum, palladium, rhodium, iridium, ruthenium and osmium; gold and silver; base metals comprising nickel, cobalt, copper, zinc, yttrium, scandium, uranium, thorium, manganese, zinc, cadmium, molybdenum, titanium, and tin; rare earth elements (REE); and rare elements comprising vanadium, germanium and gallium from a feed material containing saleable metals, comprising or consisting of any one or more of a metalliferous ore; a concentrate; a solid residue from a hydrometallurgical process; and a solid residue after solid-liquid separation of a product slurry from hot sulphuric acid leaching under pressure and/or atmospheric conditions from the metalliferous ore, concentrate or solid residue, the process comprising or consisting subjecting the feed material of the following steps comprising or consisting of:

i. leaching with hot hydrochloric acid or brine under pressure and/or atmospheric conditions with no added oxidant or reductant or with an added reductant, to produce a product slurry comprising saleable and gangue metal chlorides in hydrochloric acid solution and a solid residue containing saleable metals; and ii. subjecting the product slurry of step i. to conventional smelting and refining techniques.

In this alternative embodiment of the invention, the product slurry of step i. or its filtrate after solid-liquid separation may further be subjected to scavenging recovery of any dissolved PGMs, base metals, iron and sulphur species by techniques known to those skilled in the art including precipitation, crystallisation, reduction, ion exchange or solvent extraction, and concentration steps such as vacuum crystallisation or membrane separation.

In this alternative embodiment of the invention, the solid residue from the hot sulphuric acid leaching may be smelted prior to leaching with hot hydrochloric acid or brine.

Any one or more of the processes of the invention may be integrated into an existing process including for example, a "Kell Process" as described in WO 99/60178, (see FIG. 1), or a modified Kell Process as described in WO2014/009928 Australian Patent Application No. 2013263848, or South African Patent Application No. 2014/08682 or a conventional heap or tank leaching process for base metal recovery.

DETAILED DESCRIPTION OF THE INVENTION

Figure 1:
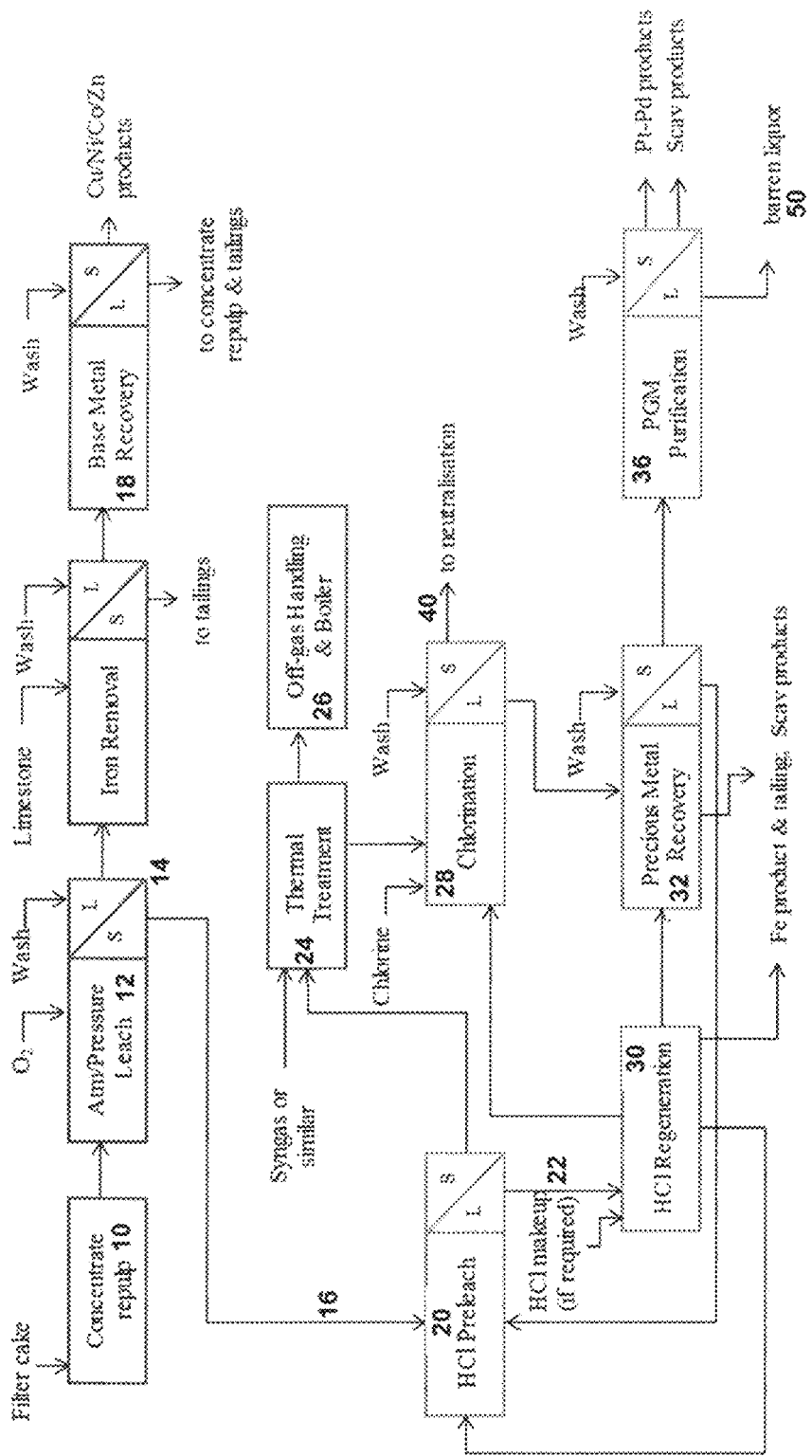
FIG. 1 is a simplified block flowsheet diagram of one possible embodiment of the process (heat treatment units are optional, depending on the feed material)

The current invention provides a hydrometallurgical process for the recovery and separation of valuable precious, base or rare elements from a feed material comprising ores, concentrates and other materials. In particular, the process is a process integrated into one or more existing valuable element extraction processes.

The novel process route described herein exemplifies significant developments that augment the hydrometallurgical process route for extraction of valuable metals from polymetallic orebodies described in International Patent Publication No. WO 99/60178, known as the "Kell Process" or "KellGold Process" (see FIG. 1), International Patent Application No. WO2014/009928, Australian Patent Application No. 2013263848 and South African Patent Application No. 2014/08682 (the contents of each of which are incorporated herein by reference). All of these processes require as the starting material an ore or a concentrate of the ore and produce one or more leach liquors containing dissolved valuable metals and other elements.

One embodiment of the present invention describes a novel way of quantitatively removing additional base, rare and gangue elements from pressure leach residue, allowing for increased efficiency of further treatment of the solids for valuable metals recovery, and comprises or consists of the steps of:

(i) providing an ore or concentrate made from an ore or other metalliferous feedstock, or a washed solid residue containing precious metals including platinum group metals (PGMs), gold and silver and residual base and rare metals from a filtered product slurry made from a pressure or atmospheric oxidation sulphate leach that comprised a sulphate leach filtrate containing base metals;

(ii) leaching the ore, concentrate, other metalliferous feedstock and/or washed solid residue in a hot hydrochloric acid (HCl) leach at atmospheric pressure and at between about 60° C.-90° C., more preferably about 70° C., with no added oxidant or reductant, or with an added reductant to form a leach filtrate with dissolved residual base metals such as nickel, cobalt, copper, zinc, gangue elements including iron, aluminium, calcium, magnesium and sulphur, PGMs and other rare and precious metals, as well as some amphoteric elements including arsenic, bismuth, selenium, tellurium and antimony and a solid residue;

(iii) separating the HCl leach filtrate from the solid residue with washing;

(iv) recovering iron, aluminium, magnesium, calcium, sulphate, value metals, hydrochloric acid and water from the HCl filtrate by way of standard methods known to those skilled in the art including any one or more of ion exchange (IX), chelation, molecular recognition technology (MRT), polymeric or other sorbents, solvent extraction, precipitation using hydroxides, ammonia, carbonates or sulphides, electrowinning, reduction, or other techniques based on techno-economic considerations, and removing gangue elements;

(v) optionally roasting or heat treating the solid residue from the HCl leaching step to form a calcine;

(vi) leaching the calcine or washed solid residue from the HCl leaching step in an oxidising chlorination leach to form a chlorination leach filtrate with dissolved precious metals in solution, suitable for efficient PGM, gold and silver recovery by way of standard methods known to those skilled in the art including ion exchange (IX), chelation, molecular recognition technology (MRT), polymeric or other sorbents, solvent extraction, precipitation using hydroxides, ammonia, carbonates or sulphides, electrowinning, reduction, or other techniques based on techno-economic considerations, and a solid waste residue containing gangue elements; and (vii) subjecting the solution products of the process to the recovery of hydrochloric acid, iron, aluminium, magnesium, calcium, sulphate and residual base metals, by one or more techniques including preboil, rectification, distillation, adsorption, reboil, pyrohydrolysis, spray roasting, hydrothermal or other techniques known to those skilled in the art, thereby to yield a barren solution.

The innovation allows for the efficient removal of iron and other gangue elements from the process, potentially decreasing reagent consumptions. Hydrochloric acid is found to leach gangue elements more rapidly and completely than other acids such as sulphuric acid. Moreover, removal of these gangue elements decreases the mass flow for downstream treatment, and effectively removes potential reagent consumers in the optional heat treatment step and non-optional chlorination leach step.

Advantageously, the process of the invention does not require the use of cyanide or mercury; toxic chemicals that are conventionally used in precious metals processing that require stringent safety and environmental controls. Moreover, the process of the invention provides an alternative, environmentally responsible method for extraction of precious metals that does not generate $SO_2$ and other pollutants which are detrimental to the environment.

The terms "element", "mineral" and "metal" are used interchangeably in this specification.

"Refractory" is typically taken to mean a gold-bearing material that yields less than 90% gold and/or silver recovery when subjected to cyanide leaching, even under highly excess cyanide additions.

"Saleable metals", "saleable elements", "valuable metals", "value metals" or "value elements" are used interchangeably and mean any element or metal that is able to generate a revenue through sale of the element or metal in metallic form or as a salt or precipitate of the metal or element. In particular, saleable metals include any one or more of: the precious metals, base metals, REEs and rare metals.

"PGMs" mean ruthenium (Ru), rhodium (Rh), palladium (Pd), osmium (Os), iridium (Ir), and platinum (Pt).

"Precious metals" means gold, (Au), silver (Ag), and PGMs in the few instances where precious metals bearing ores also contain associated minor PGMs.

As used herein, "base metals" means industrial non-ferrous metals excluding the precious metals, such as copper, lead, nickel, tin, tungsten, zinc, cadmium, manganese, cobalt, uranium, thorium, molybdenum and titanium. "Rare earth elements" means a group of chemically similar metallic elements comprising the lanthanide series (fifteen elements), and also includes scandium and yttrium as they because they tend to occur in the same ore deposits as the lanthanides and exhibit similar chemical properties. "Rare metals" means a group of metals including vanadium, germanium and gallium, and other nominal valuable metals that may be worth recovering.

"KellGold" denotes the process described in South African Patent Application No. 2014/08682. "Kell" denotes the core process described in International Patent Publication No. WO 99/60178 and modified processes described in associated patents WO2014/009928 or Australian Patent Application No. 2013263848 (all incorporated herein by reference) for recovery of PGMs and base metals from concentrates.

"Hot sulphuric acid leach" means a process of hot sulphuric acid ($H_2SO_4$) leaching comprising either or a combination of a conventional atmospheric (20-100° C.), low (100-130° C.) medium (130-220° C.) or high (220-260° C.) temperature and pressure leach using sulphuric acid.

"Hot hydrochloric acid or HCl leach" denotes the process whereby elements are leached from a solid feed by hydrochloric acid or acidified saline brine without addition of an oxidising acid such as chlorine gas or a reductant, or with addition of a reducing agent such as metal powders, sulphur dioxide producing chemicals, organic reagents, sulphide compounds or concentrates to achieve an oxidation-reduction potential (ORP) setpoint. The leach is performed at atmospheric pressure and at a temperature of from about 60° C. to 90° C., more preferably at about 70° C.

"Chlorination leach" means a conventional atmospheric (20-100° C.) or low (100-130° C.) temperature and pressure leach under oxidising conditions whereby elements are leached from a solid feed by hydrochloric acid (HCl) or saline brine in conjunction with an oxidising agent such as chlorine, hypochlorite, nitric compounds, hydrogen peroxide or others known to those skilled in the art.

An "atmospheric leach step" means a conventional atmospheric (20-100° C.), temperature and pressure leach.

The term "cooling and aging" in the context of this application means allowing PLS or other process liquor to stand for a period of time, optionally with addition of seed solids from a subsequent solid-liquid separation step and optionally with external cooling applied.

"Conventional smelting and refining techniques" include smelting, converting and other pyrometallurgical processes under conditions whereby the input solids are melted or vaporised and are well known to those skilled in the art.

"Saline brine" is a high-concentration solution of salt (usually chloride, with counterions comprising metals such as sodium, potassium, magnesium, calcium, aluminium, iron or other cations) in water.

"Scavenging recovery" means recovery of any dissolved metals or elemental species by techniques including precipitation, crystallisation, reduction, ion exchange or solvent extraction, and concentration steps such as vacuum crystallisation or membrane separation.

There is a considerable range of feedstock materials for potential extraction of precious, base or rare elements that are either untreatable using current conventional technologies, or that respond poorly, or may require the specific flowsheet development, design and construction of a custom-built plant that may be too costly to justify the capital spend given the size and other characteristics of the particular resource. In all cases, the ultimate precious, base or rare metals recovery may be less than desirable. The applicants have advantageously developed a process as described herein that accepts a wide variety of refractory or non-refractory material types as feed, with no or minimal modifications to the circuit from one feed type to the next.

As illustrated in FIG. 1, a particular embodiment of the invention is a hydrometallurgical process for extracting saleable elements including precious, base and rare metals, from a range of quite different feed materials comprising refractory, non-refractory or intractable material types. The process innovation developed by the applicant is the ability to obtain high precious metal recoveries, particularly gold and/or silver, along with by-products such as Cu, Ni, Co, Zn, Mn, Sc, $H_2SO_4$, S, PGMs and others by standard chlorination processes, but where there is sequential selective upfront removal of base metals, sulphur and gangue elements such as iron, prior to chlorination. The applicant has determined that by inclusion of processes for upfront removal of base metals, sulphur and gangue elements, it is possible to materially decrease reagent consumptions, previously a highly limiting factor with oxidising chlorination leaching, that practically negated the commercial feasibility of this process.

Moreover, the process of the invention completely avoids the use of toxic substances such as cyanide or mercury-bearing reagents in the recovery process, and also avoids the emission of pollution to the atmosphere of toxic substances such as sulphur dioxide ($SO_2$) or arsenic trioxide ($As_2O_3$) to the environment.

The feed materials input into the process can be as-mined, as-received or may be comminuted to a finer grain size. The input feed materials may also have been subjected to a previous benefication step such as screening, sizing, classification, magnetic separation, electrostatic separation, dense media sepration, radiometric sorting, optical sorting, gravity separation, or others known to those skilled in the art, to concentrate the valuable metals or reject a gangue component. However, the necessity and type of comminution or benefication at this stage would be dictated by the specific material's characteristics.

As illustrated in FIG. 1, the first step comprises subjecting a feed material which may be a concentrate (10) to a hot sulphuric acid ($H_2SO_4$) leaching step (12) under pressure and/or atmospheric conditions ("hot sulphuric acid leaching") to produce a product slurry (14) comprising valuable metal sulphates in solution and a solid residue containing precious metals. The solid residue is then separated from the metal sulphates in solution by a means of solid/liquid separation, such as by filtration or other means known to those skilled in the art.

Saleable base metals and excess sulphuric acid may be recovered by a base metal recovery step (18) from any of the solutions comprising metal sulphates, including the initial sulphuric acid leach product slurry by means of techniques such as solvent extraction, ion exchange, precipitation using hydroxides, ammonia, carbonates or sulphides, electrowinning, reduction, recycling and other techniques known to those skilled in the art based on techno-economic considerations.

The $H_2SO_4$ leach product solid residue (16) is further treated by hot hydrochloric acid (HCl) leaching at atmospheric pressure and at 70° C., with no added oxidant or reductant, or under reducing conditions (20), also referred to as a "HCl Preleach", allowing removal or conversion of excess iron from the solid residue into a HCl solution for removal by iron solvent extraction, precipitation or other means known to those skilled in the art. A small amount of reductant, such as metal powders, sulphur dioxide producing chemicals, organic reagents, sulphide compounds or concentrates, may optionally be added to the HCl Preleach (20) to achieve an oxidation-reduction potential (ORP) setpoint.

Optionally, techniques described in International Patent Publication No. WO2014/009928 (the contents of which are incorporated herein by reference) may also be applied, allowing recovery of $H_2SO_4$ and precipitation of a commercially viable iron product may be applied after the non-oxidising or reducing HCl leach.

Specifically, the non-oxidising or reducing HCl leach (20) solid residue may first be subjected to thermal treatment (24) to render the valuable metals leachable, and may produce off-gases comprising sulphur and the off-gases may then be subjected to a process of recovering sulphur (26):
  a. by condensation as an elemental sulphur intermediate product;
  b. into a sulphuric acid intermediate product; or
  c. from dryer off-gases into a sulphide, polysulphide, polythionate, thiosulphate or similar intermediate product.

Typically, the thermal treatment (24) would be performed at about 80-750° C. for up to 120 minutes, preferably at about 300-700° C. for 10 to 30 minutes, under oxidizing, neutral or reducing conditions, to remove volatile components from the solid residue and reduce or negate the preg-robbing properties of the material.

The thermal treatment may comprise a second heating step if necessary at about 500-1000° C. for up to 120 minutes, preferably at about 700-1000° C. for 30 to 120 minutes, under oxidizing, neutral or reducing conditions, to condition valuable metals to be soluble in chloride leaching medium. Additionally, this step can negate or modify any preg-robbing and encapsulation or coating properties of carbonaceous and clay minerals, thereby unlocking precious metals for subsequent chlorination leaching.

For certain materials a third additional heating step may be performed if necessary at about 100-400° C. for up to 120 minutes, preferably at about 150-300° C. for 30 to 120 minutes, under oxidizing, neutral or reducing conditions, to condition valuable metals such as Au, Ag, as well as Pt, Pd, Rh, Ru, Ir, Os (i.e. PGMs), Ni, Co, Cu, REE, Y, Sc, U, Th, Zn, Mn, Cd, Mo, V, Ti, Ge, Ga to be soluble in the chlorination leaching medium. Additionally, this step can further negate or modify any preg-robbing and encapsulation or coating properties of carbonaceous and clay minerals, thereby unlocking precious metals for chlorination leaching.

These heating steps of the thermal treatment (24) may be performed as individual steps of a sequential thermal treatment process, or as one combined step.

The off-gases discharging from one or more of the thermal treatment steps (24), or the feed gas, may be further utilised by sparging into the HCl leach step (20) product slurry, or the separated hydrochloric acid solution from the HCl leach product slurry, or into the chlorination PLS after oxidising chlorination leaching (28). For example, a reducing off-gas may be used to reduce precious metals such as PGMs or gold in solution, converting them to metals that report to the solid phase for recovery in the subsequent oxidising chlorination step (28) of the process. As another example, the gold or PGMs in solution from either the HCl leach (20) or chlorination leaching (28) may be recovered by reductive precipitation using a reducing off-gas.

After the HCl leach step (20), the hydrochloric acid solution comprising metal chlorides is subjected to a purification and/or upgrade step comprising any one or more of solvent extraction, ion exchange (IX), chelating, molecular recognition technology (MRT), polymeric or other sorbents; precipitation using hydroxides, ammonia, carbonates or sulphides, electrowinning, reduction or other techniques known to those skilled in the art (22) based on techno-economic considerations and produces an intermediate solution product and an intermediate solid residue. The intermediate solid residue is the leached in the chlorination leaching step (26).

The HCl leach step (20) is aimed at removal of gangue and residual base metals after $H_2SO_4$ leaching recovery of the majority of the base metals. The HCl used in this step can be successfully recovered in a HCl regeneration step (30) and recycled back into the process, thereby saving reagent costs. After precious metals recovery (32) and PGM purification (36) from the chlorination leach PLS, the remaining barren solution (50) is relatively clean, due to the prior removal of soluble gangue and base metals in the non-oxidising or reducing HCl leach step (20) hence, this barren solution (50) may be recycled directly to the chlorination leach (28), with top-up of recovered HCl from the HCl regeneration step (30).

The chlorination leaching step (28) may be optimised for effective recovery and/or separation of some of the saleable elements that may be present in the multiple-composition feed. Specifically, the chlorination leaching step (28) is performed under oxidising conditions using hydrochloric acid or saline brine in conjunction with an oxidising agent such as chlorine, hypochlorite, hydrogen peroxide or others known to those skilled in the art. Valuable elements such as Au, Ag, as well as Pt, Pd, Rh, Ru, Ir, Os (i.e. PGMs), Ni, Co, Cu, REE, Y, Sc, U, Th, Zn, Mn, Cd, Mo, V, Ti, Ge, Ga are leached into the chlorination pregnant leach solution (PLS), leaving a solid waste residue (40).

Precious metals are separated and recovered (32) from chlorination PLS (28) and where warranted, may be scavenged from the previous process streams, by use of conventional methods known to those skilled in the art, including techniques such as solvent extraction, ion exchange, salt crystallisation, precipitation using hydroxides, carbonates or sulphides, electrowinning, reduction and others.

Selection of specific unit processes for separation and/or recovery of by-product valuable elements is made based on techno-economic and product requirements considerations, such as the production of pure metals in the form of powder "sponge", cast bars, or end-product precursors, such as catalyst form solutions or salts. In some instances, a less pure product may be preferable.

The commercially attractive elements separated and recovered from the chlorination PLS (28) include PGMs, gold, silver and rare metals. The process of the invention allows separation of these elements from other valuable metals such as nickel, cobalt and copper, and additionally, rare earth elements, including yttrium and scandium, and uranium, thorium, vanadium, titanium, manganese, zinc and cadmium, whilst iron components may also be extracted as commercially attractive products such as pigments and nanomaterials.

The HCl and/or $H_2SO_4$ from the process may be recycled back into the process, thereby reducing operational costs and additional amounts of metals may be recovered during this recycling process. Base metals such as nickel, copper and cobalt and any minor fugitive gold, silver, PGMs or other value metals if present, can be recovered via a scavenger recovery process or are recycled along with free acid to suitable process streams earlier in the process. IX, chelating (e.g. thiol, thiouronium, polyamine or other) sorbent resins, fibres, carbons, biological materials or other materials such as solvent extractants, precipitants or reductants may be used to recover small amounts of minor fugitive PGMs, gold, silver or other value metals if present, from the process streams.

Figure 2:
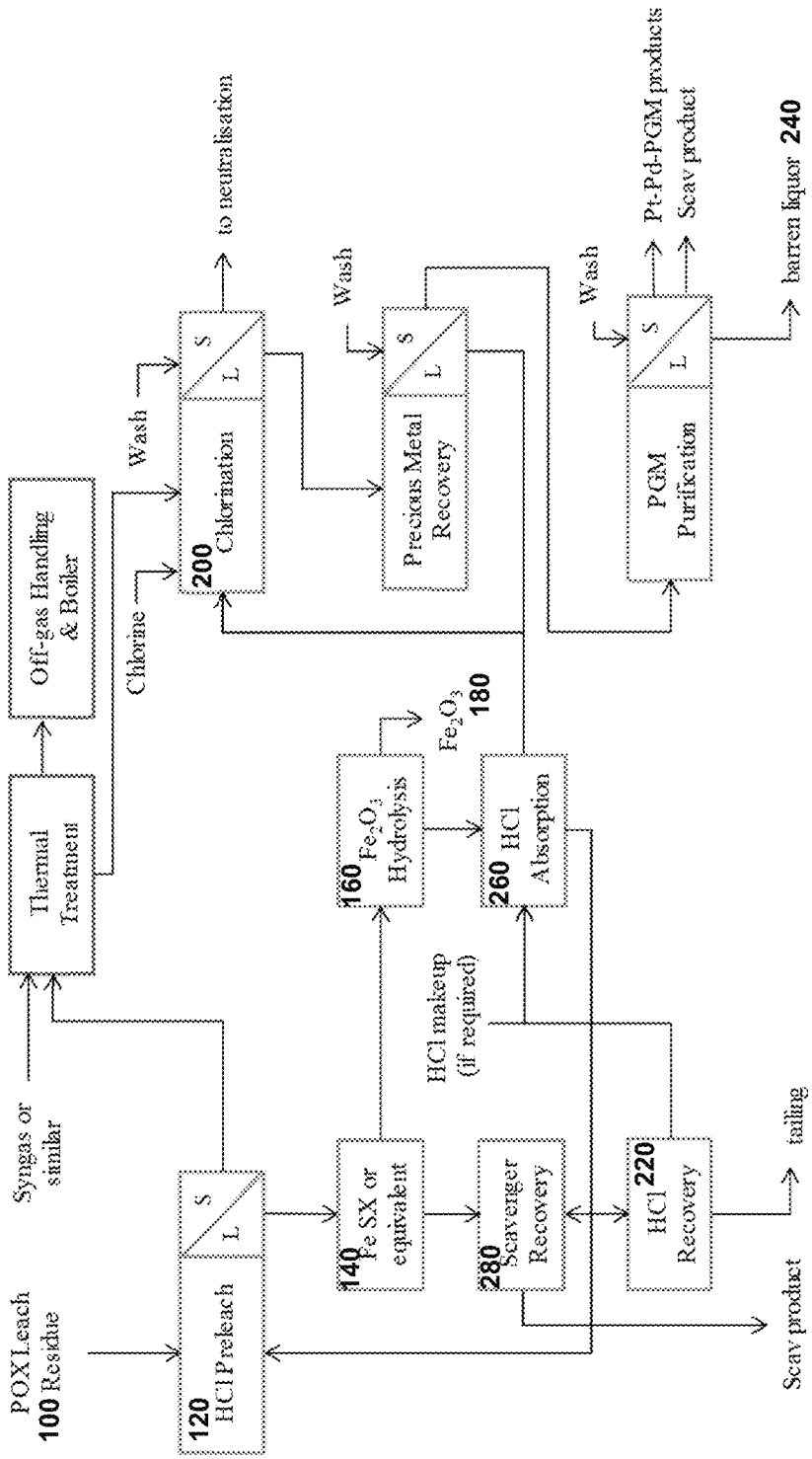
FIG. 2 is a simplified block flowsheet diagram illustrating more detail of one example of its implementation (heat treatment units are optional, depending on the feed material)

In a second particular embodiment of the invention as illustrated in FIG. 2, iron is first removed from the HCl leach (120) PLS by means of solvent extraction (140) or other routes known to those skilled in the art, such as hydroxide or carbonate precipitation. The stripped solution may be subjected to hydrolysis (160) using techniques such as by means of one or more steps including preboil, rectification, distillation, adsorption, reboil, pyrohydrolysis, spray roasting, hydrothermal and/or other technique combinations known to those skilled in the art, producing a potentially saleable or dischargeable iron-bearing product (180), alternatively produced directly as a hydrolysed precipitate The barren chloride stream from the non-oxidising or reducing HCl leach (120), Fe extraction (140) or hydrolysis (160), scavenger recovery (280) and/or chlorination leach (200) steps may be subjected to a preboil-rectify-reboil or sulfuric treatment (220), thereby achieving several outcomes, including recovery of strong HCl, removal of calcium, and recovery of residual metal sulphate or sulphide salts, such as copper, nickel, cobalt, rhodium, ruthenium, iridium, vanadium, germanium, gallium or scandium, for recycle or recovery. The barren chloride solution (240) after recovery of both primary and scavenged precious metals and other fugitive elements is low in iron and other metals and hence, may be recycled directly or subjected to direct acid and metals recovery by conventional techniques, such as hydrothermal, spray roasting, hydropyrolysis or others known to those skilled in the art.

To effect iron and gangue removal, the hydrochloric acid leach or brine solution may be neutralised with limestone (140) to precipitate ferric hydroxide and other gangue elements (160) and produce a calcium chloride filtrate which may be subjected to scavenger recovery of any residual value metals (280) using a sorbent or precipitant, then evaporated and the calcium removed by sulfuric acid addition (220). The hydrochloric acid, brine or calcium chloride filtrate may then be recycled directly to HCl Preleach (120) or chlorination (200).

Where warranted, the barren chloride solutions (50, 220, 240) may be treated by exploiting differences in solubility of metal sulphates under selected conditions. For example, the barren chloride solutions (50, 220, 240) may be contacted with 70% $H_2SO_4$ and then preheated in a pre-boil stage in which the bulk of the HCl is boiled off for recovery. Calcium may be removed by precipitation with gypsum and the remaining solution is introduced to a distillation column where water remains largely unvolatilised, while the remaining HCl is almost completely volatilised or recycled in the remaining solution Vapours from the HCl recovery (220) stages can be passed through a water-cooled absorber column where the HCl is recovered by absorption (260) into chlorination filter wash water, producing 33% HCl suitable for use in the non-oxidising or reducing HCl leach step (120) or the oxidising chlorination leach step (200) and/or while directly reusing wash water.

A possible alternative embodiment of the invention, depending on technoeconomic considerations would be to subject the product slurry comprising saleable and gangue metal chlorides in hydrochloric acid solution and a solid residue containing saleable metals from the HCl leaching step (120) to conventional smelting and refining techniques.

In this alternative embodiment of the invention, the product slurry from the HCl leaching step (120) or its filtrate after solid-liquid separation may further be subjected to scavenging recovery of any dissolved PGMs, base metals, iron and sulphur species by techniques including precipitation, crystallisation, reduction, ion exchange or solvent extraction, and concentration steps such as vacuum crystallisation or membrane separation.

In this alternative embodiment of the invention, the solid residue from the PDX leaching step (100) may be smelted prior to providing into the reaction vessel.

EXAMPLES

Typically, different combinations of techniques are required, depending on specific sample mineralogy, chemistry and metallurgical response. The following examples are provided to demonstrate the efficacy of the described technique that have been brought to bear to treat specific feed materials. These examples should in no way be interpreted to in any way limit the scope of the invention and are for illustration only.

Example 1

Treatment of a Primary PGM Concentrate with 14% Fe, 11% S

Figure 3:
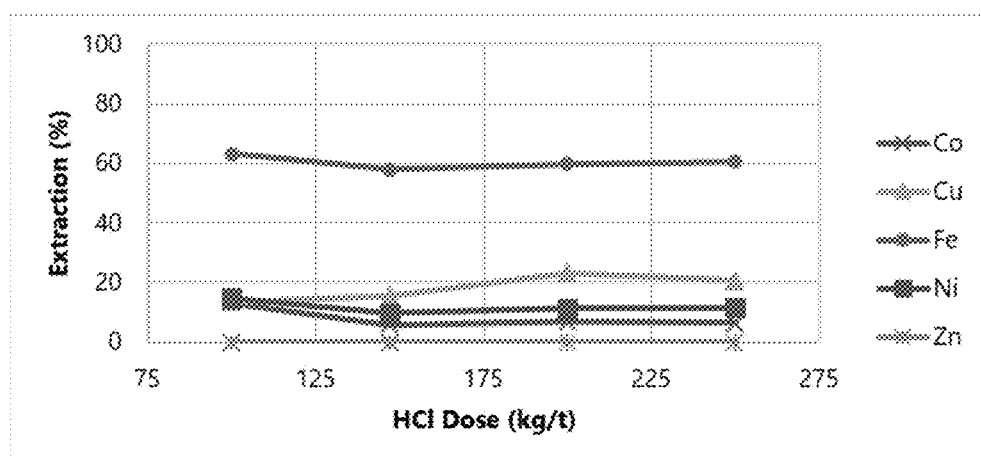
FIG. 3 shows the hot HCl leaching for extraction of base metals and iron from a pressure leach residue from a 14% Fe, 11% S high-sulphide PGM concentrate.

In this example, a flotation concentrate with head assay shown in Table 1 is subjected to sulphuric acid pressure oxidation (PDX) leaching >95% nickel, cobalt and copper and ~2% iron, and the filtered and washed PDX residue is subjected to an atmospheric non-oxidising hot hydrochloric acid (HCl Preleach) leaching step to effect the removal of iron as well as residual base metals such as nickel, copper, cobalt, zinc, into a separate stream. FIG. 3 shows the extractions of base metals and iron with acid dose in the HCl Preleach step. A sample of residue from this step was subjected to heat treatment and chlorination, with overall extractions from this unoptimized test of >95% nickel, cobalt, copper, palladium, platinum. Table 2 shows a breakdown of elemental extractions in the main extraction stages.

TABLE 1

Head Assays for a High-Sulphide PGM Concentrate

| | Assay, g/t | | | Assay, % | | | | |
|---|---|---|---|---|---|---|---|---|
| Sample | Pt | Pd | Au | Ni | Cu | Co | Fe | S |
| High-sulphide PGM conc | 29.6 | 24.2 | 3.5 | 29.4 | 36.8 | 0.11 | 13.7 | 11.1 |

TABLE 2

Stagewise Elemental Extractions from a High-Sulphide PGM Concentrate

| | Extraction (%) | | | | | | | |
|---|---|---|---|---|---|---|---|---|
| Stage | Pt | Pd | Au | Ni | Cu | Co | Fe | S |
| POX | 0 | 0 | 0 | 97 | 98 | 95 | 2 | 97 |
| HCl Preleach | 0 | 0 | 0 | 55 | 85 | 26 | 71 | 98 |
| HCl Postleach | 0 | 1 | 0 | 54 | 52 | 14 | 10 | — |
| Chlorination | 96 | 98 | 87 | 41 | 49 | 13 | 15 | — |
| Overall | 96 | 98 | 87 | 99 | 99 | 97 | 82 | 99 |

Example 2

Treatment of a Primary PGM Concentrate with 13% Fe, 5% S

Figure 4:
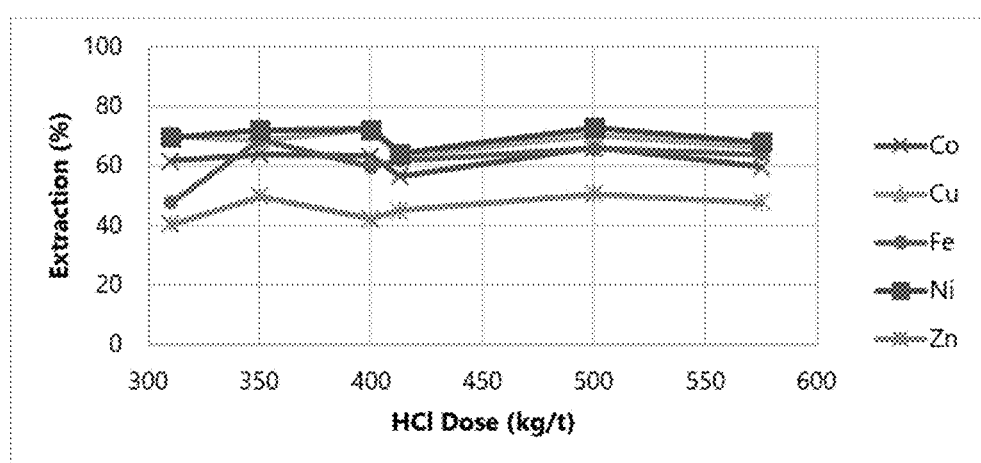
FIG. 4 shows the hot HCl leaching for extraction of base metals and iron from a pressure leach residue from a 13% Fe, 5% S low-sulphide PGM concentrate.

In this example, a flotation concentrate with head assay shown in Table 3 is subjected to sulphuric acid pressure oxidation (PDX) leaching >85% nickel, cobalt and copper and ~1% iron, and the filtered and washed PDX residue is subjected to an atmospheric hot non-oxidising hydrochloric acid (HCl Preleach) leaching step to effect the removal of iron as well as residual base metals such as nickel, copper, cobalt, zinc, into a separate stream. FIG. 4 shows the extractions of base metals and iron with acid dose in the HCl Preleach step. Table 4 shows a breakdown of elemental extractions in the main extraction stages.

TABLE 3

Head Assays for a Low-Sulphide PGM Concentrate

| | Assay, g/t | | | Assay, % | | | |
|---|---|---|---|---|---|---|---|
| Sample | Pt | Pd | Au | Ni | Cu | Co | Fe | S |
| Low-sulphide PGM conc | 46.9 | 30.3 | 1.3 | 2.4 | 1.7 | 0.11 | 13.0 | 4.7 |

TABLE 4

Stagewise Elemental Extractions from a Low-Sulphide PGM Concentrate

| | Extraction (%) | | | | | | | |
|---|---|---|---|---|---|---|---|---|
| Stage | Pt | Pd | Au | Ni | Cu | Co | Fe | S |
| PDX | 0 | 0 | 0 | 87 | 86 | 88 | 1 | 81 |
| HCl Preleach | 0 | 0 | 1 | 85 | 82 | 70 | 67 | 92 |
| Chlorination | 96 | 96 | 74 | 49 | 89 | 19 | 9 | 69 |
| Overall | 96 | 97 | 87 | 99 | 99 | 97 | 77 | 99 |

Example 3

Treatment of a Refractory Gold Concentrate with 30% Fe, 32% S

Figure 5:
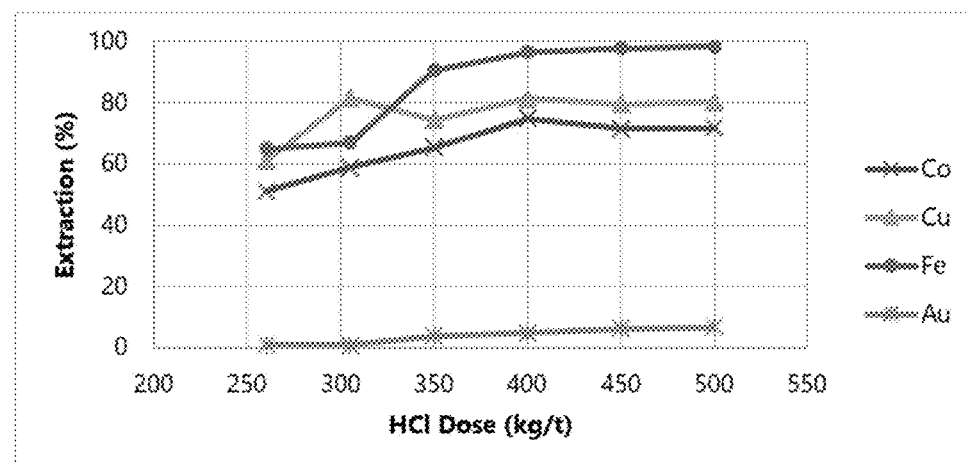
FIG. 5 shows the hot HCl leaching for extraction of base metals and iron from a pressure leach residue from a refractory gold concentrate.

In this example, a flotation concentrate with head assay shown in Table 5 is subjected to sulphuric acid pressure oxidation (PDX) leaching 34% iron, and the filtered and washed PDX residue is subjected to an atmospheric hot hydrochloric acid (HCl Preleach) leaching step to effect the removal of iron, silver and arsenic, as well as residual base metals such as copper, into a separate stream. FIG. 5 shows illustrative extractions of elements with acid dose in an HCl Preleach step. Table 6 shows a breakdown of elemental extractions in the three main extraction stages.

TABLE 5

Head Assays for a Refractory Gold Concentrate

| | Assay, g/t | | | | Assay, % | | | |
|---|---|---|---|---|---|---|---|---|
| Sample | Au | Ag | Pt | Pd | As | Cu | Fe | S |
| Refractory gold conc | 27.0 | 2.4 | 1.7 | 0.9 | 6.3 | 0.1 | 29.5 | 31.8 |

TABLE 6

Stagewise Elemental Extractions from a Refractory Gold Concentrate

| | Extraction (%) | | | | | | | |
|---|---|---|---|---|---|---|---|---|
| Stage | Au | Ag | Pt | Pd | As | Cu | Fe | S |
| POX | 0 | 0 | 0 | 0 | 29 | 85 | 34 | 73 |
| HCl Preleach | 5 | 98 | 15 | 63 | 100 | 85 | 98 | 93 |
| Chlorination | 96 | 77 | 69 | 68 | 88 | 55 | 32 | 83 |
| Overall | 96 | 99 | 74 | 88 | 100 | 99 | 99 | 99 |

To illustrate the recovery of precious metals from both the HCl Preleach PLS and the chlorination PLS, the results of adsorbent extraction-stripping tests showed the following extractions: Au; Ag, Pt 99% and Pd 98%. Table 7 shows some illustrative results demonstrating efficient recovery of gold onto a commercially available adsorbent.

TABLE 7

Recovery of Precious Metals from Pregnant Leach Solutions from Treating a Refractory Gold Concentrate with Adsorbent

| | Recovery, % | | | |
|---|---|---|---|---|
| Stage | Au | Ag | Pt | Pd |
| HCl Preleach | 94 | 99 | 96 | 95 |
| Chlorination | 99 | 96 | 99 | 98 |

Example 4

Treatment of a Refractory Gold—Copper Concentrate with 34% Fe, 39% S

Figure 6:
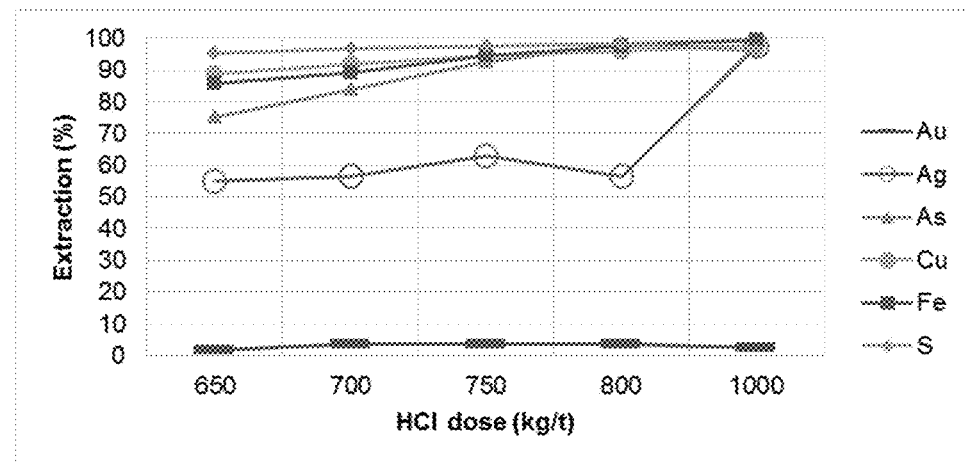
FIG. 6 shows the hot HCl leaching for extraction of base metals and iron from a pressure leach residue from a copper-gold concentrate.

In this example, a flotation concentrate with head assay shown in Table 8 is subjected to sulphuric acid pressure oxidation (PDX) leaching 34% iron, and the filtered and washed PDX residue is subjected to an atmospheric hot hydrochloric acid (HCl Preleach) leaching step to effect the removal of iron, silver and arsenic, as well as residual base metals such as copper, into a separate stream. FIG. 6 shows the extractions of elements with acid dose in the HCl Preleach step. Table 9 shows a breakdown of elemental extractions in the three main extraction stages.

TABLE 8

Head Assays for a Refractory Gold Concentrate

| | Assay, g/t | | | Assay, % | | |
|---|---|---|---|---|---|---|
| Sample | Au | Ag | As | Cu | Fe | S |
| Refractory gold conc | 170 | 134 | 820 | 11.6 | 33.7 | 39.3 |

TABLE 9

Stagewise Elemental Extractions from a Refractory Gold-Copper Concentrate

| | Extraction, % | | | | | |
|---|---|---|---|---|---|---|
| Stage | Au | Ag | As | Cu | Fe | S |
| POX | 0 | 0 | 33 | 99 | 34 | 99 |
| HCl Preleach | 3 | 98 | 99 | 98 | 100 | 96 |
| Chlorination | 98 | 12 | 0 | 18 | 37 | 0 |
| Overall | 98 | 98 | 99 | 99 | 99 | 99 |

In this instance a heat treatment step was introduced after the HCl Preleach to condition the chlorination feed for leaching. To illustrate the recovery of precious metals from both the HCl Preleach PLS and the chlorination PLS, the results of adsorbent extraction-stripping tests showed the following extractions, respectively: Ag 98% and Au 99%. Table 10 shows some illustrative results demonstrating efficient recovery of gold from both HCl Preleach and Chlorination streams onto several commercially available adsorbents.

TABLE 10

Recovery of Gold from Pregnant Leach Solutions from Treating a
Refractory Gold-Copper Concentrate with Adsorbent

| | Au Recovery, % | |
|---|---|---|
| Adsorbent | HCl Preleach Stream | Chlorination Stream |
| A | 99 | 99 |
| B | 89 | 100 |
| C | 97 | 100 |

REFERENCES

1. Liddell, K. S. and Adams, M. D. Kell hydrometallurgical process for extraction of platinum group metals and base metals from flotation concentrates, J. S. Afr. Inst. Min. Metall. Trans., vol. 112, January 2012, pp. 31-36.
2. Liddell, K. S., Newton, T., Adams, M. D. and Muller, B. Energy consumptions in Kell hydrometallurgical refining versus conventional pyrometallurgical smelting of PGM concentrates, J. S. Afr. Inst. Min. Metall. Trans., vol. 111, February 2011, pp. 127-132.

The invention claimed is:

1. A hydrometallurgical process for extracting one or more saleable metal comprising: precious elements consisting of one or more platinum group metal (PGM), gold and silver; a base metal consisting of one or more of nickel, cobalt, copper, zinc, uranium, thorium, manganese, cadmium, molybdenum, titanium, and tin; a rare earth element (REE), yttrium and/or scandium; and a rare element consisting of one or more of vanadium, germanium and gallium from a feed material containing the saleable metals comprising any one or more of: a metalliferous ore or metalliferous feedstock; a concentrate; a solid residue from a hydrometallurgical process; and/or a solid residue after solid-liquid separation of a product slurry from hot sulphuric acid leaching under pressure and/or atmospheric conditions from the metalliferous ore or metalliferous feedstock, concentrate or solid residue, wherein the hydrometallurgical process for extracting one or more saleable metals comprises subjecting the feed material to the following steps:
   a) leaching with hot hydrochloric acid or brine under pressure and/or atmospheric conditions either with no added oxidant and no added reductant, or with no added oxidant and an added reductant, to produce a product slurry comprising saleable and gangue metal chlorides in a hydrochloric acid or brine solution and a solid residue containing the saleable metals;
   b) subjecting the hydrochloric acid or brine solution comprising metal chlorides from step a) to a purification and/or upgrade step comprising any one or more of solvent extraction, ion exchange (IX), chelating, molecular recognition technology (MRT), sorption including with polymeric sorbents; precipitation using hydroxides, ammonia, carbonates or sulphides, electrowinning or reduction to produce an intermediate solution product and one or more intermediate solid residues comprising secondary scavenged saleable metals and gangue elements;
   c) subjecting the intermediate solution product from step b) to one or more steps comprising preboil, rectification, distillation, adsorption, reboil, pyrohydrolysis, spray roasting, sulfate precipitation and hydrothermal processing thereby to yield one or more of hydrochloric acid, calcium, iron and saleable metals for recovery, or residual gangue material for disposal and a barren solution;
   d) separating the intermediate solid residues from step b) by solid-liquid separation, and leaching the separated intermediate solid residues in an oxidising chlorination leach to produce soluble saleable metal chlorides in a chlorination pregnant leach solution (PLS) and a solid waste product;
   e) subjecting the chlorination PLS comprising metal chlorides from step d) to any one or more of ion exchange (IX), chelation, molecular recognition technology (MRT), sorption including with polymeric sorbents, solvent extraction, precipitation using hydroxides, ammonia, carbonates or sulphides, electrowinning or reduction to produce a secondary intermediate solution product and a solid residue containing the saleable metals;
   f) subjecting the secondary intermediate solution product or solid residue from step e) to one or more techniques comprising preboil, rectification, distillation, adsorption, reboil, pyrohydrolysis, spray roasting, sulfate precipitation and hydrothermal processes to yield one or more of hydrochloric acid, calcium, iron and the saleable metals for recovery or residual gangue material for disposal and a barren solution; and
   g) recovering the saleable metals.

2. The hydrometallurgical process according to claim 1, wherein the process further comprises or consists of the steps of subjecting the solid residue from step a) to heat treatment under oxidising, neutral or reducing conditions followed by addition of the heat-treated solid residue to step d).

3. The hydrometallurgical process according to claim 1, wherein the process further comprises or consists of the steps of subjecting the solid residue from step a) to heat treatment under oxidising, neutral or reducing conditions, followed by a second leaching step in hot hydrochloric acid under pressure and/or atmospheric conditions either with no added oxidant and no added reductant, or with no added oxidant and with an added reductant, to produce a product slurry comprising saleable and gangue metal chlorides in a hydrochloric acid solution and a solid residue containing the saleable metals, followed by further processing according to steps c) to g).

4. The hydrometallurgical process according to claim 1, wherein the chlorination PLS from step d), and/or the intermediate solution product from either step b) or e) are further subjected to one or more purification and/or upgrading techniques comprising IX, chelating, MRT, sorption including with polymeric sorbents, solvent extraction, precipitation using hydroxides, ammonia, carbonates or sulphides, electrowinning and reduction to produce further intermediate solid residues containing the saleable metals for recovery and further intermediate solution products that are added to step f).

5. The hydrometallurgical process according to claim 1, wherein the solid/liquid separation of the solid residue containing saleable metal s from the product slurry from hot sulphuric acid leaching under pressure and/or atmospheric conditions includes filtration.

6. The hydrometallurgical process according to claim 1, wherein the process further comprises or consists of a step of separating, including by filtration, solid residue from the saleable metal chlorides in solution from step a), b), d), e) and, where present from the further intermediate solution products, and then providing the resultant separated solution to the next step in the process.

7. The hydrometallurgical process according to claim 1, wherein the feed material ore, concentrate, metalliferous feedstock or residue is as-mined, or is processed by crushing, milling, and/or is subjected to a benefication step comprising any one or more of crushing, grinding, screening, sizing, classification, magnetic separation, electrostatic separation, flotation and gravity separation, thereby to concentrate the valuable metals or reject a gangue component and to produce an intermediate ore product for providing to step a).

8. The hydrometallurgical process according to claim 2, wherein the heat treatment is performed at from or about 80-750° C. for up to 120 minutes.

9. The hydrometallurgical process according to claim 8, wherein the heat treatment includes a second heat treatment performed at from or about 500-1000° C. for up to 120 minutes, or about 700-1000° C. for 30 to 120 minutes, under oxidizing, neutral or reducing conditions.

10. The hydrometallurgical process according to claim 9, wherein the heat treatment includes a third heat treatment performed at from or about 100-600° C. for up to 240 minutes, or about 100-400° C. for 60-180 minutes, under oxidizing, neutral or reducing conditions.

11. The hydrometallurgical process according to claim 8, wherein the heat treatment is performed as individual steps of a sequential heat treatment process, or as one combined step.

12. The hydrometallurgical process according to claim 1, wherein the heat treatment generates off-gases and such off-gases are sparged into the slurry in step a) or the hydrochloric acid solution in step b) or the chlorination PLS in step e).

13. The hydrometallurgical process according to claim 2, wherein any one or more reducing gas comprising syngas, carbon monoxide and hydrogen are sparged into the slurry in step a) or the hydrochloric acid solution in step b) or the chlorination PLS in step e).

14. The hydrometallurgical process according to claim 4, wherein the chlorination PLS of step d) and/or the intermediate solution product of step b), step e) and/or where present the further intermediate solution products are subjected to a sorption step whereby the saleable metals are adsorbed on to a resin or sorbent and base metals are discharged in a solution.

15. The hydrometallurgical process according to claim 4, wherein the chlorination PLS of step d) and/or the solution product of step b), step e) and/or where present the further intermediate solution products are subjected to precipitation and purification comprising any one or more of the following steps:
  A. subjecting the anyone or more of the chlorination PLS of step d) or the intermediate solution product of step b), step e) and/or where relevant the further intermediate solution products, to sulphide precipitation, thereby to produce a product slurry comprising a solid residue containing elemental sulphur, metal sulphides and/or alloys and a discharge solution;
  B. performing solid-liquid separation, comprising by filtration, on the product slurry of A. to separate the solid residue from step A. from the discharge solution, at temperatures of between about or from 10-130° C.;
  C. subjecting the solid residue from step B. to a series of purification and recovery steps comprising:
    C.i. sublimation of the solid residue at temperatures of between about or from 200-500° C., thereby to remove sulphur and produce a solid residue and a sulphur distillate product;
    C.ii. optionally dissolving the solid residue of step C.i. in a solvent for sulphur, comprising any one or more of aromatic hydrocarbons; chlorinated or sulphidised hydrocarbons; and sulphur-containing ligands, at temperatures of between about 10-130° C., thereby to remove sulphur and produce a solid residue and a sulphur distillate product;
    C.iii. pressure oxidation leaching the solid residue from step C.i. and/or where relevant step C.ii., at temperatures of between about or from 110-230° C.;
    C.iv. atmospheric sulphuric acid leaching the solid residue from step C.iii. at temperatures of between about or from 10-110° C. to yield a slurry comprising a solid residue comprising precious metals and a sulphate leachate solution;
    C.v. separating the solid residue comprising precious metals from the sulphate leachate solution in the slurry of step C.iv. by solid-liquid separation, comprising filtration, at temperatures of between about or from 10-130° C.;
    C.vi. optionally subjecting the sulphate leachate solution from step C.vi. to a sorption step thereby adsorbing precious metals to a resin or sorbent and discharging base metals in a solution; and
    C.vii. subjecting the sulphate leachate solution from step C.v. and, where relevant, the discharge solution from step C.vii. to one or more techniques comprising ageing, evaporation, precipitation and recycling; and
  D. optionally subjecting the discharge solution from step B. to a sorption step thereby adsorbing precious metals to a resin or sorbent and discharging base metals in a solution.

16. The hydrometallurgical process according to claim 15, wherein the discharge solution from step B. and/or the intermediate solution product from step b), e) and/or where present the further intermediate solution products are subjected to a hydrochloric acid, calcium and residual base metal recovery and separation step comprising:
  I. feeding the discharge solution and/or the intermediate solution product into a preboil evaporator together with seed gypsum thereby to generate a hydrochloric acid gas and gypsum precipitate, followed by solid-liquid separation to yield precipitated gypsum for recovery and a treated discharge solution;
  II. (a) feeding the treated discharge solution from step I. to a sulphuric acid rectification column or reboiler together with sulphuric acid, thereby to generate a hydrochloric acid gas and a sulphuric acid solution comprising saleable and/or recoverable base and/or rare metals; or
  II. (b) feeding the discharge solution from step I to a hydrothermal, spray roaster or pyrohydrolysis reactor to yield a slurry comprising a solid iron oxide residue for recovery and a base and/or rare metals solution, followed by solid-liquid separation;
  III. subjecting the sulphuric acid solution generated in step II. (a) and/or the base and/or rare metals metal solution from step II. (b) to a cooling and aging step to crystallise the metal sulphate salts for recovery and/or recycling, or to one or more steps comprising sorption, evaporation and precipitation for recovery and/or recycling; and
  IV. subjecting the hydrochloric acid gas of step I. or step II. to distillation and absorption, thereby to recover a hydrochloric acid solution.

17. The hydrometallurgical process according to claim 16, wherein the recovered hydrochloric acid is recycled back into the hydrochloric acid leach step a) and/or the chlorination leach step d).

18. The hydrometallurgical process according to claim 1, wherein the barren solution from step c) and/or step f) are recycled to step b) as makeup water, thereby allowing for reuse of hydrochloric acid.

19. The hydrometallurgical process according to claim 1, wherein the saleable metal sulphates in solution of the feed material consist of one or more metal sulphate salts of copper, nickel, cobalt, rhodium, ruthenium, iridium, vanadium, germanium, gallium and scandium.

20. The hydrometallurgical process according to claim 1, wherein the feed material comprises any one of an individual material and a blend of refractory and non-refractory materials having a different composition.

21. The hydrometallurgical process according to claim 1, wherein the process further comprises subjecting the hydrochloric acid solution of step a) and/or the chlorination PLS of step d) to ageing for crystallisation of silica, comprising the steps of:
AA. feeding the hydrochloric acid solution or chloride PLS into a holding vessel;
BB. adding seed silica solids to the chloride solution of AA.;
CC. allowing the chloride solution to stand at ambient temperature until a solid residue comprising silica is precipitated out of solution;
DD. separating the precipitated solid residue comprising silica from the solution of step CC. to produce a silica-depleted solution; and
feeding the silica-depleted solution of step DD. into step a).

22. The hydrometallurgical process according to claim 4, wherein the process comprises subjecting any one or more of the hydrochloric acid solution of step a), the chlorination PLS of step d), the intermediate solution products from step b) and e), and the further intermediate solution products to concentration to produce a concentrated solution by any one or more of the following steps:
1. evaporation and condensation recovery of HCl from the solution(s); and
2. filtration or membrane-based separation, comprising reverse osmosis (RO) or nanofiltration (NF) of the solution(s).

23. The hydrometallurgical process according to claim 1, wherein sorption comprises any one or more of the following steps:
(aaa) contacting a solution with an ion exchange (IX) resin or sorbent thereby adsorbing precious metals to the resin or sorbent and discharging base metals in a solution;
(bbb) eluting the adsorbed precious metals from the IX resin or sorbent and precipitating the the precious metals from the eluate using a reductant and where PGMs are present, using a caustic or ammoniacal solution to form a high-grade value metal concentrate or individual value metal products;
(ccc) directly incinerating the contacted resin or sorbent to produce a high-grade saleable metal concentrate or individual saleable metal products; and
(ddd) optionally, further processing of the precious, base and/or saleable metals produced by any of steps (aaa) to (ccc).

24. The hydrometallurgical process according to claim 23, wherein elution step (bbb) performed using a solution comprising acidic thiourea, salts of sulphite or hydrosulphite or chloride.

25. The hydrometallurgical process according to claim 1, wherein the hydrochloric acid leach solution of step a) and/or the chlorination leach solution of step d) contain iron chloride, further comprising step of treatment by any one or more of pressure, precipitation, crystallization, concentration by evaporation, reverse osmosis, membrane filtration, comprising nanofiltration, solvent extraction, ion exchange, sparging/rectification, pyrohydrolysis and hydrothermal processes to produce an iron-bearing product.

26. The hydrometallurgical process according to claim 1, wherein the hydrochloric acid or brine leach solution of step a), b) or c) is neutralised with limestone to precipitate ferric hydroxide and other gangue elements and produce a calcium chloride filtrate, which is evaporated and the calcium removed by sulphuric acid addition and recycling of the hydrochloric acid, brine or calcium chloride filtrate to step a) or d).

27. The hydrometallurgical process according to claim 1, wherein the chlorination leaching medium of step d) comprises hydrochloric acid or saline brine in conjunction with an oxidising agent comprising chlorine, hypochlorite, hydrogen peroxide and the leaching step is performed under oxidising conditions, thereby to generate a chlorination PLS containing one or more saleable elements.

28. The hydrometallurgical process according to claim 1, wherein the chlorination PLS generated in step d) contains one or more saleable elements further comprising a step of separation and/or recovery of the one or more saleable elements by any one or more of solvent extraction, IX, precipitation using hydroxides, carbonates or sulphides, electrowinning and reduction.

29. The hydrometallurgical process according to claim 1, wherein the chlorination leaching step d) comprises a chloride leaching medium that has a pH of between about 2.5 and 7.5 held at a temperature in the range of between about or from 50-150° C.

30. The hydrometallurgical process according to claim 1, wherein the chlorination leaching step d) comprises a chloride leaching medium with a free acidity of between about or from 50 to 300 g/L HCl held at a temperature in the range of between about or from 50-150° C.

31. The hydrometallurgical process according to claim 1, wherein the chlorination leaching step d) is performed by atmospheric or pressure autoclave leaching with saline brine under oxidising conditions.

* * * * *